United States Patent
Ball (10) Patent No.: US 7,290,197 B2
(45) Date of Patent: Oct. 30, 2007

(54) CORRECTING DATA USING REDUNDANCY BLOCKS

(75) Inventor: Matt Ball, Boulder, CO (US)

(73) Assignee: Quantum Corporation, San Jose, CA (US)

( * ) Notice: Subject to any disclaimer, the term of this patent is extended or adjusted under 35 U.S.C. 154(b) by 695 days.

(21) Appl. No.: 10/454,420

(22) Filed: Jun. 3, 2003

(65) Prior Publication Data

US 2004/0260971 A1 Dec. 23, 2004

(51) Int. Cl.
*G11C 29/00* (2006.01)

(52) U.S. Cl. .................. 714/763; 714/765; 714/790; 714/703

(58) Field of Classification Search ............. 714/763, 714/765, 758, 798, 790, 756, 784, 703, 7
See application file for complete search history.

(56) References Cited

U.S. PATENT DOCUMENTS

| | | | | |
|---|---|---|---|---|
| 3,860,907 | A * | 1/1975 | Marshall | 714/798 |
| 5,136,592 | A | 8/1992 | Weng | |
| 5,623,507 | A * | 4/1997 | Burns et al. | 714/765 |
| 6,343,305 | B1 * | 1/2002 | Koç et al. | 708/492 |
| 6,438,724 | B1 * | 8/2002 | Cox et al. | 714/758 |
| 2003/0126551 | A1 * | 7/2003 | Mantha et al. | 714/790 |

FOREIGN PATENT DOCUMENTS

EP 0756385 A2 1/1997
EP 1213841 A2 6/2002

OTHER PUBLICATIONS

Reed-Solomon Codes, "An introduction to Reed-Solomon codes: principles, architecture and implementation", 4i2i Communications LTD. 1996, 1997, 1998, 7 pgs.
J. Sylvester, "Reed Solomon Codes", Elektrobit, Jan. 2001, 7 pgs.
Reed Solomon Code (RS), Vocal Technologies, Ltd., 2003, 2 pgs.
W. W. Peterson et al., "Error-Correcting Codes" 2nd ed. (book), MIT 1972, 9 pgs.
European Search Report mailed Sep. 1, 2004, for EP patent application No. EP 04252998 filed on May 21, 2004, 3 pages.

* cited by examiner

*Primary Examiner*—Guy Lamarre
*Assistant Examiner*—Fritz Alphonse
(74) *Attorney, Agent, or Firm*—Morrison & Foerster LLP (57) ABSTRACT

Errors in data retrieved from a storage medium are corrected by retrieving a plurality of data blocks and a plurality of redundancy blocks associated with the plurality of data blocks from the storage medium. One or more data blocks retrieved from the storage medium having errors are identified and removed. When the number of data blocks identified as having errors is less than the number of retrieved redundancy blocks, one or more excess redundancy blocks are removed, and one or more retained redundancy blocks are kept from the retrieved redundancy blocks. One or more new redundancy blocks are generated based on the retrieved data blocks. One or more residual blocks are generated based on the one or more new redundancy blocks and the one or more retained redundancy blocks. One or more data blocks identified as having errors are corrected using the generated one or more residual blocks.

40 Claims, 5 Drawing Sheets

CORRECTING DATA USING REDUNDANCY BLOCKS

BACKGROUND

1. Field of the Invention

The present application generally relates to correcting data retrieved from a storage medium, and more particularly to using redundancy blocks to correct errors in data retrieved a storage medium.

2. Related Art

Data is stored in a storage device by writing the data to a storage medium in the storage device. The stored data can be later retrieved from the storage device by reading the data from the storage medium. However, for a number of reasons, an error may exist in the data retrieved from the storage device, meaning that the stored data cannot be retrieved or is different from the data originally stored on the storage medium. For example, a portion of the stored data on the storage medium may degenerate over time such that the portion of the stored data cannot be properly read at a later time.

In a conventional technique to correct such errors, a set of redundancy blocks is generated for the data and stored with the data in the storage medium. When the stored data is later retrieved and an error is detected, the redundancy blocks are used to correct the retrieved data. Typically all of the redundancy blocks in the set of redundancy blocks are used to correct the retrieved data regardless of the size of the error in the retrieved data. Accessing all of the redundancy blocks, however, consumes access time to the storage medium, increases the numbers of calculations that need to be performed, and increases correction time.

SUMMARY

In one exemplary embodiment, a plurality of data blocks and a plurality of redundancy blocks associated with the plurality of data blocks are retrieved from a storage medium. One or more data blocks retrieved from the storage medium having errors are identified and removed. When the number of data blocks identified as having errors is less than the number of retrieved redundancy blocks, one or more excess redundancy blocks are removed, and one or more retained redundancy blocks are kept from the retrieved redundancy blocks. One or more new redundancy blocks are generated based on the retrieved data blocks. One or more residual blocks are generated based on the one or more new redundancy blocks and the one or more retained redundancy blocks. One or more data blocks identified as having errors are corrected using the generated one or more residual blocks.

DETAILED DESCRIPTION

The following description sets forth numerous specific configurations, parameters, and the like. It should be recognized, however, that such description is not intended as a limitation on the scope of the present invention, but is instead provided to provide a better description of exemplary embodiments.

Figure 1:
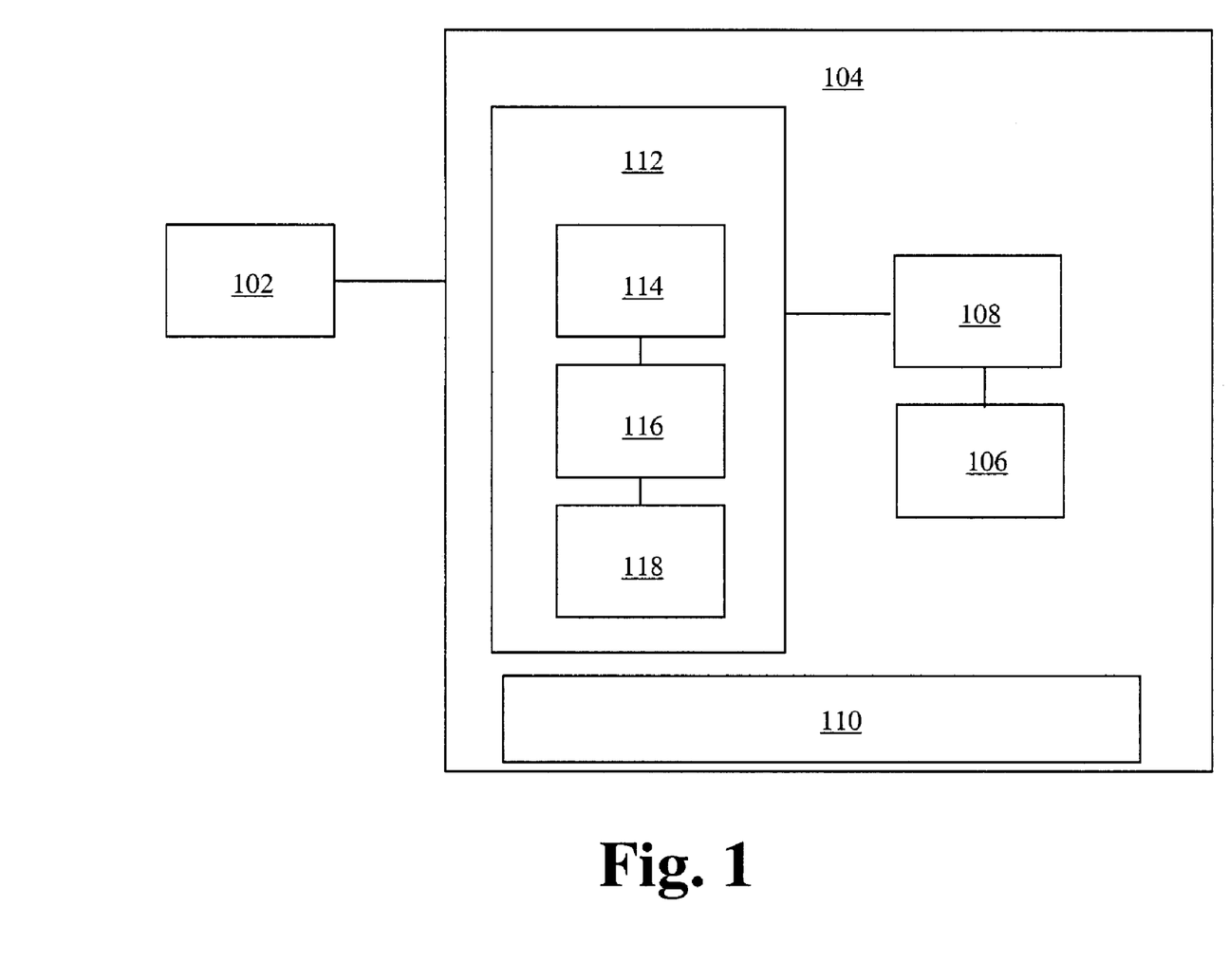
FIG. 1 depicts an exemplary host terminal connected to an exemplary storage device.

With reference to FIG. 1, a host terminal 102 is depicted connected to a storage device 104. Host computer 102 can be any type of computer, such as a personal computer, a workstation, a server, and the like. Storage device 104 can be any type of storage drive, such as a tape drive, a hard drive, and the like. It should be recognized that host terminal 102 can be connected to any number of storage devices 104, and any number of host terminals 102 can be connected to one or more storage devices 104.

With continued reference to FIG. 1, in one exemplary embodiment, storage device 104 is configured to detect and correct errors in data stored in storage device 104. More specifically, when data stored in storage device 104 is retrieved, storage device 104 is configured to use redundancy blocks, which are also referred to as error correction code (ECC) redundancy blocks, to correct errors in the retrieved data, such as if the retrieved data is different from the data that was originally stored in storage device 104 or if the stored data cannot be retrieved. Additionally, in the present exemplary embodiment, check sums, such as cyclic redundancy checking (CRC) codes, are used to detect errors in the retrieved data. However, it should be recognized that redundancy blocks can be used to detect as well as correct errors.

In the embodiment depicted in FIG. 1, storage device 104 includes a storage medium 106, a channel and read/write head 108, a processor 110, and an error detection/correction unit 112. In storage device 104, data is stored in storage medium 106. Read/write head 108 reads and/or writes data to storage medium 106. Processor 110 controls the operation of storage device 104, including the operation of channel and read/write head 108. As will be described in greater detail below, error detection/correction unit 112 detects and corrects errors in data stored in storage medium 106.

In the present exemplary embodiment, error detection/correction unit 112 includes a data buffer 114, a redundancy block encoder/decoder 116, and a CRC encoder/decoder 118. When data is to be stored on storage medium 106, data is received from host terminal 102 and written to data buffer 114. Redundancy block encoder/decoder 116 and CRC encoder/decoder 118 generate redundancy blocks and CRC codes for data in data buffer 114. Read/write head 108 then writes the data and the generated redundancy blocks and CRC codes to storage medium 106.

When data is to be read from storage medium 106, read/write head 108 reads data and the redundancy blocks from storage medium 106 to data buffer 114. As will be described in greater detail below, any errors in the data read from storage medium 106 are detected and corrected using the CRC codes and redundancy blocks. The data may then be transferred to host terminal 102.

In one exemplary embodiment, data is transferred between host terminal 102 and storage device 104 in data records, which are stored in a cache. The data records are divided into data blocks of a predetermined length, such as 2 kBytes, 4 kBytes, 6 kBytes, and the like. It should be recognized, however, that data blocks of various lengths may be used.

In the present exemplary embodiment, after data blocks are retrieved from storage medium 106, CRC codes are used to detect errors in the retrieved data blocks, where an error in a retrieved data block indicates that the data in the retrieved data block is different from the data in the data block when the data was originally stored in storage medium 106. More specifically, prior to storing a data block in storage medium 106, a CRC code is generated for the data block and stored with the data block in storage medium 106. When the data block is later retrieved, a new CRC code is generated for the retrieved data block. The new CRC code is then compared to the CRC code retrieved from storage medium 106, which corresponds to the retrieved data block and was originally generated for the retrieved data block before storing the retrieved data block in storage medium 106. If the new CRC code and the retrieved CRC code differ, then an error is detected for that data block.

Additionally, in the present exemplary embodiment, redundancy blocks are used to correct errors in the retrieved data blocks. More specifically, prior to storing data blocks in storage medium 106, redundancy blocks are generated based on the data blocks, and stored with the data blocks in storage medium 106. As will be described in greater detail below, when the data blocks are later retrieved, data blocks identified as having errors are corrected using the redundancy blocks.

In one exemplary embodiment, redundancy blocks 204 are Bose-Chaudhuri-Hocquenghem (BCH) codes, and more particularly Reed-Soloman codes. For a more detailed description of Reed-Solomon codes, see Peterson & Weldon, Error Correcting Codes, 2d Edition, MIT Press, 1972, which is incorporated in its entirety herein by reference. It should be recognized, however, that various types of error correction codes may be used.

Figure 2:
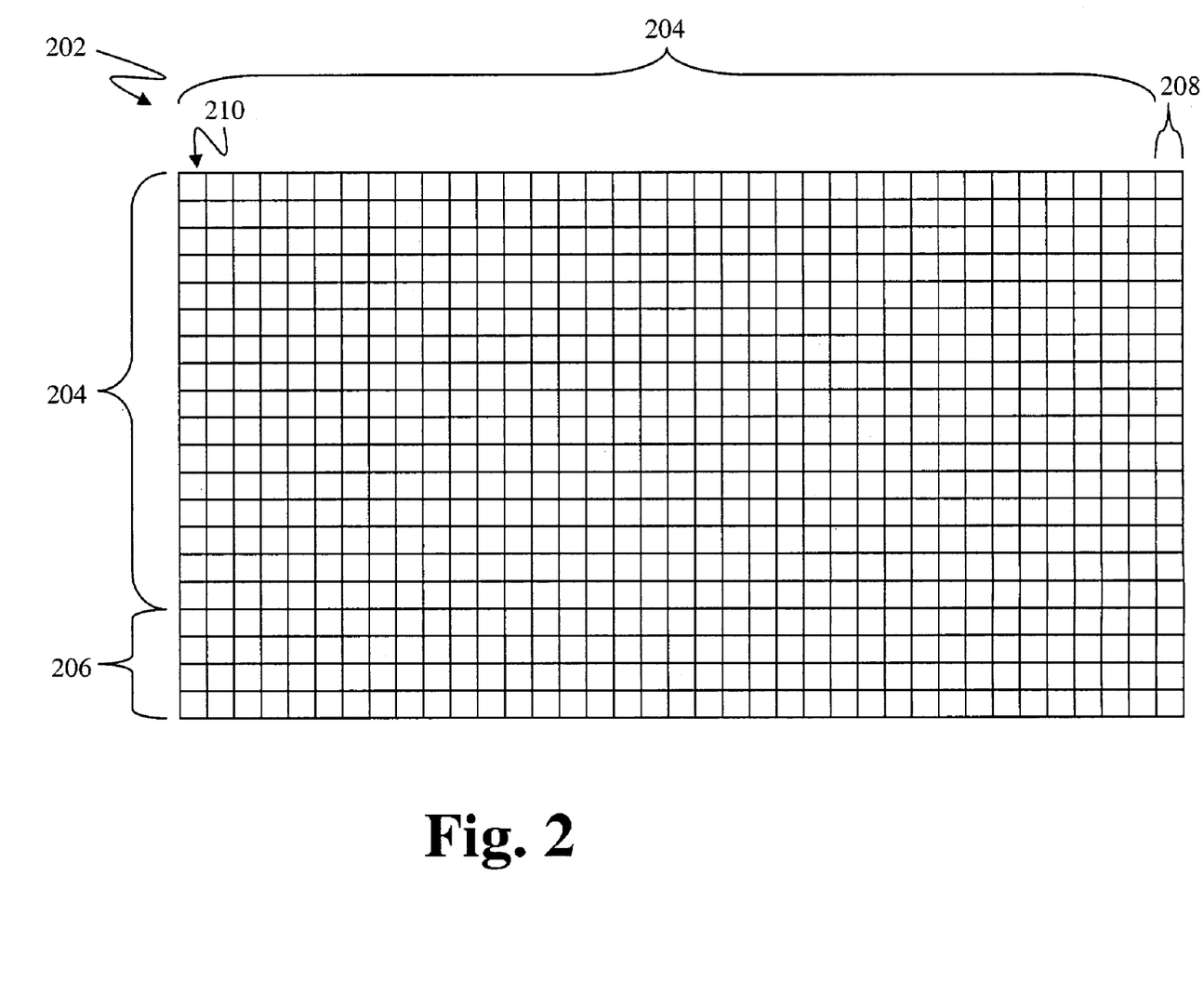
FIG. 2 depicts an exemplary entity having a set of data blocks, redundancy blocks, and cyclic redundancy checking codes.

In one exemplary embodiment, a set of data blocks, a set of redundancy blocks, and a set of CRC codes can be read and written together as a group referred to as an "entity." For example, with reference to FIG. 2, an entity 202 is depicted having 16 data blocks 204, 4 redundancy blocks 206, and 20 CRC codes 208. It should be recognized, however, that entity 202 can include various numbers of data blocks 204, redundancy blocks 206, and CRC codes 208. Additionally, as noted above, redundancy blocks can be used to detect as well as correct errors in the retrieved data blocks. Thus, CRC codes 208 can be replaced with a set of redundancy blocks.

FIG. 2 depicts the form in which entity 202 is stored in data buffer 114 (FIG. 1). However, it should be recognized that entity 202 need not exist physically in the form depicted in FIG. 2. It should also be recognized that data in entity 202, and more particularly the data in a data block 204, need not correspond to a single file. Instead, in one exemplary embodiment, data received from host terminal 102 (FIG. 1) is interleaved. As such, the data in a particular data block 204 can correspond to portions of separate files received from host terminal 102 (FIG. 1).

Figure 3:
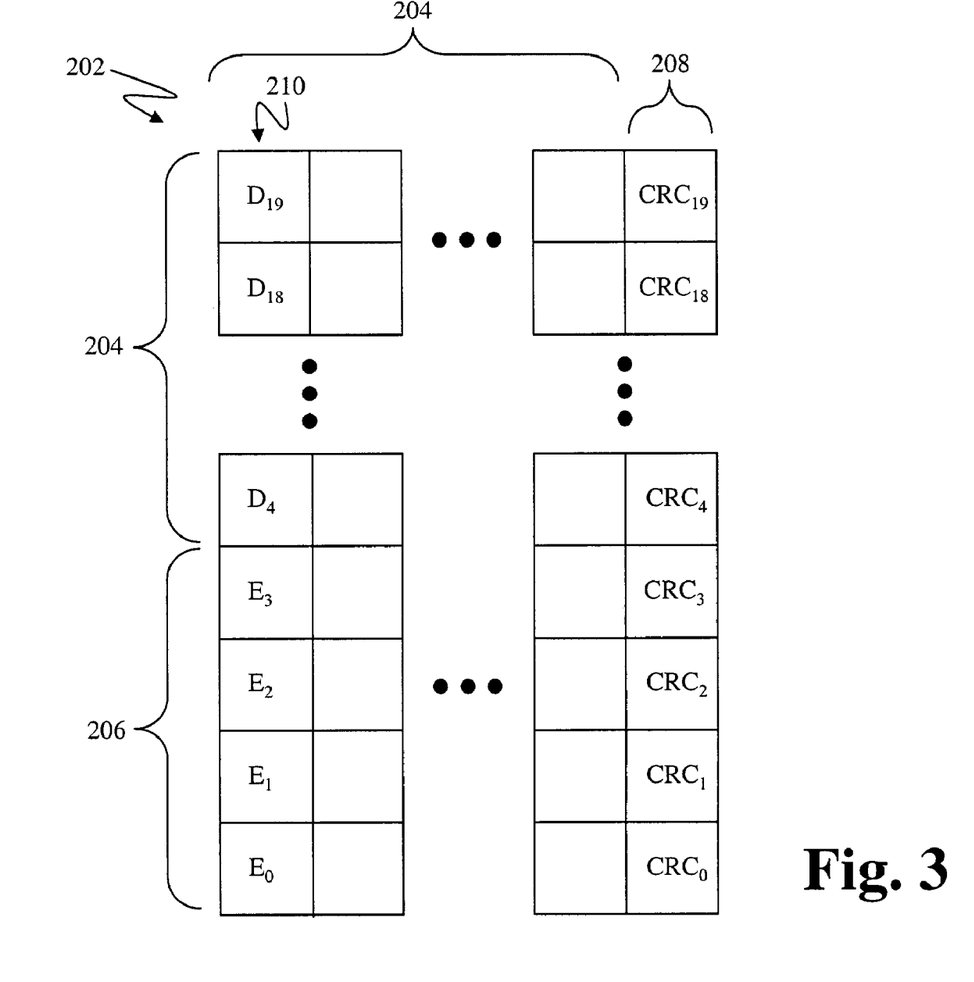
FIG. 3 depicts portions of the exemplary entity of FIG. 2.

FIG. 2 also depicts logical relationships between data blocks 204, redundancy blocks 206, and CRC codes 208 of entity 202. With reference to FIG. 3, portions of entity 202 are shown in greater detail to more clearly illustrate the logical relationships between data blocks 204, redundancy blocks 206, and CRC codes 208.

As depicted in FIG. 3, a CRC code 208 corresponds to a data block 204 or redundancy block 206 and is used to detect an error in data block 204 or redundancy block 206. For example, CRC code $CRC_{19}$ corresponds to data block $D_{19}$ of entity 202. Thus, to detect an error in data block $D_{19}$, after retrieving data block $D_{19}$ from storage medium 106 (FIG. 1), a new CRC code $CRC_{19}'$ is generated for retrieved data block $D_{19}$. The new CRC code $CRC_{19}'$ is then compared to the CRC code retrieved from storage medium 106 (FIG. 1) corresponding to retrieved data block $D_{19}$ (i.e., CRC code $CRC_{19}$). If the new CRC code $CRC_{19}'$ and the retrieved CRC code $CRC_{19}$ differ, then an error is detected for data block $D_{19}$.

In the present exemplary embodiment, one redundancy block may be used to correct one data block 204 of entity 202. Thus, in the example depicted in FIG. 2, a total of 4 redundancy blocks 206 may be used to correct a total of 4 data blocks 204 of entity 202 having a total of 16 data blocks 204. For example, redundancy block $E_3$ may be used to correct a first data block of entity 202. Redundancy block $E_2$ may be used to correct a second data block of entity 202. Redundancy block $E_1$ may be used to correct a third data block of entity 202. Redundancy block $E_0$ may be used to correct a fourth data block of entity 202.

In the present exemplary embodiment, each redundancy block 204 is generated based on the data in all of the data blocks of entity 202. For example, redundancy block $E_0$, $E_1$, $E_2$, and $E_3$ are each generated based on the data in data blocks $D_4$, $D_2$, ..., and $D_{19}$. As described above, with reference to FIG. 1, redundancy blocks 204 are generated by redundancy block encoder 116. As also described above, redundancy blocks are initially generated for data received from host terminal 102. The generated redundancy blocks and the received data are then stored in storage medium 106.

With reference again to FIG. 3, although redundancy blocks $E_0$, $E_1$, $E_2$, and $E_3$ are generated based on the same set of data (i.e., data blocks 204 of entity 202), each redundancy block 204 is unique as to each other. More specifically, in the present embodiment, redundancy blocks $E_0$, $E_1$, $E_2$, and $E_3$ are Bose-Chaudhuri-Hocquenghem (BCH) codes, and more particularly Reed-Solomon codes. Redundancy blocks $E_0$, $E_1$, $E_2$, and $E_3$ are generated using redundancy block encoder 116 (FIG. 1). For a description of an exemplary encoder, see U.S. Pat. No. 5,136,592, titled ERROR DETECTION AND CORRECTION SYSTEM FOR LONG BURST ERRORS, issued on Aug. 4, 1992, which is incorporated herein by reference in its entirety.

Figure 4:
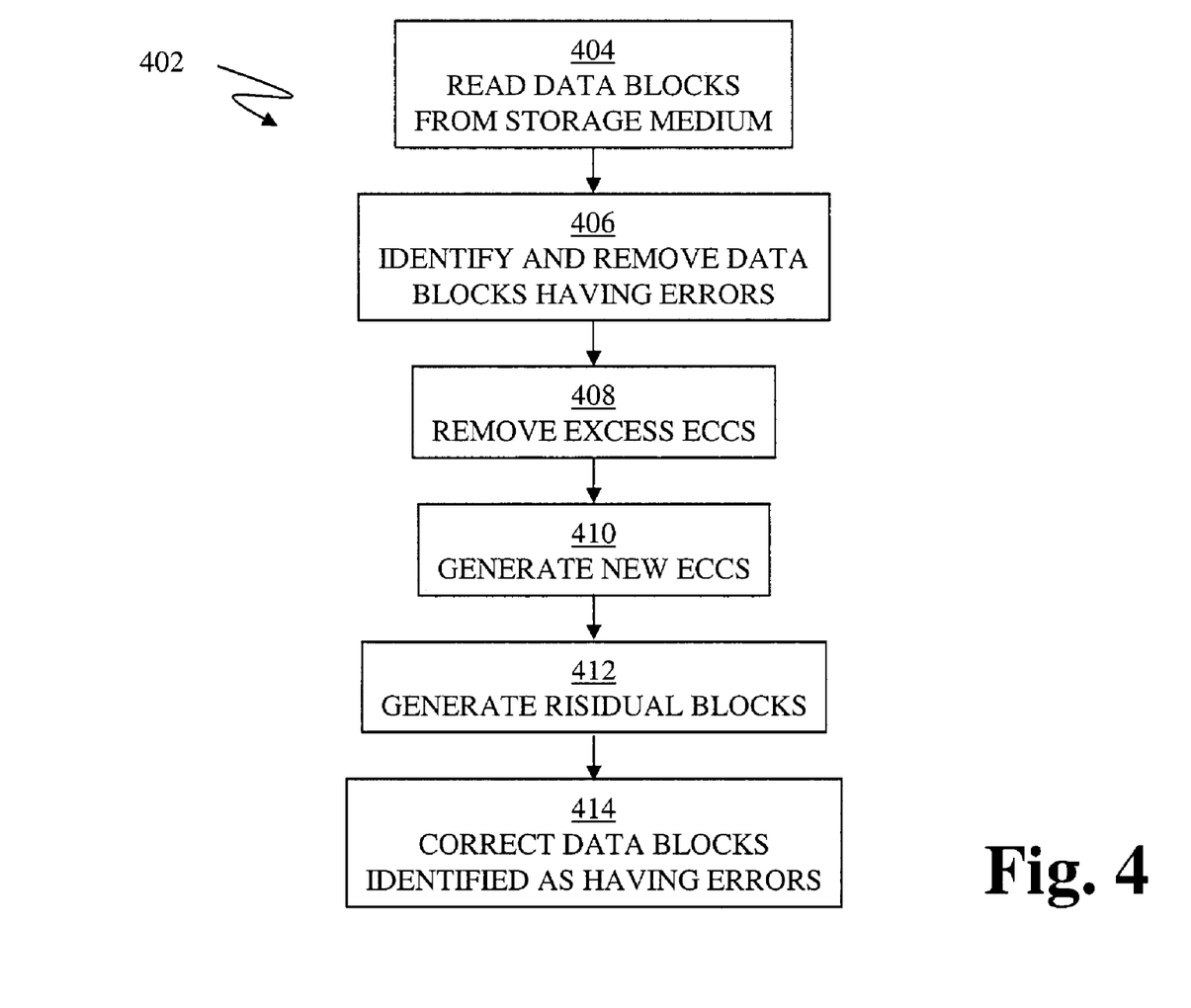
FIG. 4 depicts an exemplary process to correct data retrieved from a storage medium.

With reference to FIG. 4, an exemplary process 402 is depicted for correcting error in data blocks retrieved from a storage medium using redundancy blocks. More specifically, FIG. 4 depicts exemplary process 402 implemented as a computer program, which includes computer executable instructions to direct the operation of a storage device. For example, with reference to FIG. 1, the process depicted in FIG. 4 can direct the operation of processor 110 of storage device 104. It should be recognized, however, that exemplary process 402 (FIG. 4) can be implemented in hardware, such as in an Application-Specific Integrated Circuit (ASIC).

With reference to FIG. 4, it should be recognized that process 402 assumes that a set of redundancy blocks were previously generated for a set of data blocks, and the set of redundancy blocks and the set of data blocks were previously stored on the storage medium. For the sake of example, assume that n redundancy blocks were generated for m data blocks. Thus, in the example depicted in FIG. 2, n equals 4 and m equals 16.

With reference again to FIG. 4, in 404, a set of data blocks and set of redundancy blocks are read from the storage medium. Additionally, in the present exemplary embodiment, a set of CRC codes are read from the storage medium. As noted above, another set of redundancy blocks can be used rather than the set of CRC codes.

In 406, data blocks having errors are identified and removed. As described above, in the present embodiment, CRC codes are used to identify data blocks that have errors. The data blocks identified as having errors can then be marked as erasures.

In one exemplary embodiment in which storage device 104 (FIG. 1) is a tape drive and storage medium 106 (FIG. 1) is a magnetic tape, the data blocks and redundancy blocks are read from the magnetic tape and stored in a data buffer. As a data block or a redundancy block is read, the CRC code corresponding to the data block or redundancy block is also read from the magnetic tape. A new CRC code is generated based on the data block or redundancy block read from the magnetic tape, then the new CRC code is compared with the retrieved CRC code. If the new CRC code and the retrieved CRC code differ, then an error is detected and the retrieved data block or redundancy block is flagged as having an error. Thus, in this exemplary embodiment, the CRC codes are not stored in the data buffer with the retrieved data blocks and redundancy blocks. It should be recognized, however, that the CRC codes can be stored for later use. Additionally, the data blocks, redundancy blocks, and the CRC codes can be retrieved from the magnetic tape and stored in the data buffer together, then the data blocks and/or redundancy blocks having errors can be identified using the CRC codes stored in the data buffer.

In 408, any excess redundancy blocks are removed. As described above, one redundancy block can be used to correct one data block in the set of data blocks retrieved from the storage medium. Thus, of the m data blocks retrieved from the storage medium, n data blocks can be corrected using n redundancy blocks. If l data blocks were identified as having errors and l is less than n, then the excess data blocks (i.e., n–l) can be removed.

Thus, in the example depicted in FIG. 2 where 4 redundancy blocks are used (n=4), if 4 data blocks are identified as having errors (l=4), then no redundancy blocks are removed (n–l=4–4=0). However, if 3 data blocks are identified as having errors (l=3), then 1 redundancy block is removed (n–l=4–3=1). If 2 data blocks are identified as having errors (l=2), then redundancy blocks are removed (n–l=4–2=2). If 1 data blocks are identified as having errors (l=1), then 3 redundancy blocks are removed (n–l=4–1=3). With reference again to FIG. 4, note that if no data blocks are identified as having errors (l=0), then error correction process 402 would not need to be performed.

In 410, new redundancy blocks are generated based on the retrieved data blocks. In the present exemplary embodiment, in generating new redundancy blocks based on the retrieved data blocks, the data blocks identified as having errors in 408 are replaced with dummy data blocks containing all zeros. Alternatively, the new redundancy blocks can be generated based on the retrieved data blocks while keeping the data blocks identified as having error. Additionally, in the present exemplary embodiment, with reference to FIG. 1, new redundancy blocks are generated using redundancy block encoder 118.

For example, with reference to FIG. 2, assume that the first and third data blocks are identified as having errors. Thus, 2 data blocks are identified as having errors (i.e., l=2). Thus, 2 new redundancy blocks (i.e., l=2) are calculated based on the retrieved data. As descried above, in generated the 2 new redundancy blocks, the first and third data blocks are replaced with dummy data blocks containing all zeros.

In 412, residual blocks are generated based on the new redundancy blocks and the retrieved redundancy blocks. More specifically, a residual block is generated by performing an Exclusive-OR (XOR) operation between a new redundancy block and a retrieved redundancy block. Mathematically the residual block is a remainder from dividing a retrieved code word by a generator polynomial. Again the number of residual blocks generated corresponds to the number of data blocks identified as having errors (i.e., l).

In 414, the data blocks identified as having errors are corrected using the generated residual blocks. In the present exemplary embodiment in which Reed-Solomon codes are used, a data block identified as having errors is corrected by performing a Galois Field matrix multiplication operation between the set of generated residual blocks and a correction matrix.

In the present exemplary embodiment, to generate a correction matrix for use in correcting data blocks having errors, data and redundancy block symbols that form a basic redundancy block unit are grouped as a code word. For example, with reference to FIG. 2, a code word 210 includes an 8-bit symbol of each data block 204 and redundancy block 206 in entity 202. Thus, when data blocks 204 are 2 kbytes long, then there are 2,000 codewords. It should be recognized, however, that code words 210 and data blocks 204 can be any lengths.

A code word polynomial is a combination of data polynomials and redundancy block polynomials. More specifically, a data block polynomial is:

$$D(x) = \sum_{i=0}^{M-1} D_i x^i,$$

where M is the number of data blocks and $D_i$ is a particular data block. A redundancy block polynomial is:

$$E(x) = \sum_{j=0}^{N-1} E_j x^j$$

where N is the number of redundancy blocks and $E_i$ is a particular redundancy block. Thus, a code word polynomial is:

$$C(x) = \sum_{i=0}^{M-1} D_i x^{i+N} + \sum_{j=0}^{N-1} E_j x^j = D(x)x^N + E(x).$$

The redundancy block polynomial is the remainder of dividing the data block polynomial by a generator polynomial (G(x)). The generator polynomial G(x) contains N consecutive powers of $\alpha$ as roots, where $\alpha$ is a primitive element in a Galois Field. In the present exemplary embodiment, the first root of G(x) is assumed to be $\alpha^0$, which reduces the amount of computation. Thus, the generator polynomial, assuming the first root is $\alpha^0$ is:

$$G(x) = \prod_{i=0}^{N-1} (x - \alpha^i).$$

In one exemplary embodiment, the following generator polynomial can be used:

$$G(x) = (x - \alpha^0)(x - \alpha^1)(x - \alpha^2)(x - \alpha^3)$$
$$= x^4 + \alpha^{75}x^3 + \alpha^{249}x^2 + \alpha^{78}x + \alpha^6$$
$$= x^4 + (15)x^3 + (54)x^2 + (120)x + (64),$$

where the Galois Field is defined by $g(x)=x^8+x^4+x^3+x^2+1$ and $\alpha=00000010$. Note that Galois Field math does not distinguish between addition and subtraction. Thus, A+A=0, just as A−A=0. However, at times, it is convenient to use a "−" operator to emphasize that A+A=0.

The relationship between D(x), E(x), and G(x) is summarized below:

$$\frac{D(x)x^N}{G(x)} = Q(x) + \frac{E(x)}{G(x)}.$$

Note that Q(x) is the quotient from the division of $D(x)x^N$ by G(x). By rearranging the equation, the following is obtained:

$$D(x)x^N+E(x)=Q(x)G(x).$$

Note that the left side of the equation is also the definition of the code word polynomial:

$$C(x)=Q(x)G(x).$$

Thus, the code word polynomial is a multiple of the generator polynomial. Additionally, C(x) is zero if x is a root of G(x).

Now assume that C'(x) is a code word with data blocks having errors. Evaluating C'(x) at a root of G(x) generates a partial syndrome. There is one partial syndrome for each root of G(x). If all the partial syndromes are zero, then no error exists within the code word. If any of the partial syndromes are non-zero, then an error exists somewhere within the code word.

Now assume that Y(x) is an error polynomial. The following two equations describe Y(x):

$$Y(x) = \sum_{i=0}^{\rho-1} Y_i x^{B_i}$$

$$C'(x) = Y(x) + C(x)$$

where ρ is the number of retrieved data blocks and redundancy blocks having errors, $Y_i$ is the value of a particular error (where i is between 0 and ρ−1), and $B_i$ is the block number (location) of a particular error. Assume that D'(x) includes the set of recovered data blocks and E'(x) contains the set of recovered redundancy blocks. Thus, $$C'(x)=D'(x)x^N+E'(x).$$

As described above, in the present exemplary embodiment, a new set of redundancy blocks ($\overline{E}(x)$) is generated based on data blocks retrieved from the data storage medium (D'(x)) using redundancy block encoder 116 (FIG. 1). The corresponding code word ($\overline{C}(x)$) is then:

$$\overline{C}(x)=D'(x)x^N+\overline{E}(x).$$

Note that $\overline{C}(x)=0$ when x equals a root of the generator polynomial G(x) similar to C(x).

Next, an error polynomial (Y(x)) is obtained based on the equations from above. The first equation is the equation for C'(x):

$$D'(x)x^N+E'(x)=b(x)+C(x) \;(=C'(x)).$$

The second equation is the equation for $\overline{C}(x)$:

$$D'(x)x^N+\overline{E}(x)=\overline{C}(x).$$

By adding these equations, the following is obtained:

$$D'(x)x^N+E'(x)+D'(x)x^N+\overline{E}(x)=Y(x)+C(x)+\overline{C}(x).$$

In Galois Field math, A+A=0. Therefore, the D'(x) terms can be removed:

$$E'(x)+\overline{E}(x)=Y(x)+C(x)+\overline{C}(x).$$

By evaluating this equation where x is a root of the generator polynomial, the C(x) and $\overline{C}(x)$ terms both go to zero:

$$Y(x)=E'(x)+\overline{E}(x) \text{ (when x is a root of G(x))}.$$

By substituting Y(x), E'(x) and $\overline{E}(x)$ with their summation descriptions, the following equations are obtained:

$$\sum_{i=0}^{\rho-1} Y_i x^{B_i} = \sum_{i=0}^{N-1} E_i x^i + \sum_{i=0}^{N-1} \overline{E}_i x^i$$

(when x is a root of G(x))

$$\sum_{i=0}^{\rho-1} Y_i x^{B_i} = \sum_{i=0}^{N-1} (E_i + \overline{E}_i) x^i$$

(when x is a root of G(x)).

There are N equations describing the error location polynomial—one equation for each root of G(x). If $\alpha^0$ is the first root of G(x), then the above equations become:

$$S_j = \sum_{i=0}^{\rho-1} Y_i (\alpha^j)^{B_i} = \sum_{i=0}^{N-1} (E_i + \overline{E}_i)(\alpha^j)^i$$

or, $$S_j = \sum_{i=0}^{\rho-1} Y_i (\alpha^{B_i})^j = \sum_{i=0}^{N-1} (E_i + \overline{E}_i)(\alpha^i)^j$$

(with switched exponents). This equation represents the jth partial syndrome.

In general, conventional Reed-Solomon decoding techniques directly compute the partial syndromes and solve for Y(x). However, computation of the partial syndromes typically requires additional hardware. As described below, in the present exemplary embodiment, Y(s) is determined without using hardware to compute partial syndromes.

In the present exemplary embodiment, an error location value ($X_i$) is determined using the following equation:

$$X_i = \alpha^{B_i}.$$

The error location value remains constant throughout the correction process, and can be computed using a lookup table, or by other exponentiation techniques.

The partial syndrome equation can be simplified by using $X_i$ instead of $B_i$. More specifically, the partial syndrome equation becomes:

$$S_j = \sum_{i=0}^{\rho-1} Y_i(X_i)^j = \sum_{i=0}^{N-1} (E_i + \overline{E}_i)(\alpha^i)^j.$$

By writing out all the N partial syndrome equations, the following matrix equation is obtained:

$$\begin{bmatrix} (X_0)^0 & (X_1)^0 & \cdots & (X_{\rho-1})^0 \\ (X_0)^1 & (X_1)^1 & \cdots & (X_{\rho-1})^1 \\ \vdots & \vdots & \ddots & \vdots \\ (X_0)^{N-1} & (X_1)^{N-1} & \cdots & (X_{\rho-1})^{N-1} \end{bmatrix} \begin{bmatrix} Y_0 \\ Y_1 \\ \vdots \\ Y_{\rho-1} \end{bmatrix} =$$

$$\begin{bmatrix} (\alpha^0)^0 & (\alpha^1)^0 & \cdots & (\alpha^{N-1})^0 \\ (\alpha^0)^1 & (\alpha^1)^1 & \cdots & (\alpha^{N-1})^1 \\ \vdots & \vdots & \ddots & \vdots \\ (\alpha^0)^{N-1} & (\alpha^1)^{N-1} & \cdots & (\alpha^{N-1})^{N-1} \end{bmatrix} \begin{bmatrix} E_0 + \overline{E}_0 \\ E_1 + \overline{E}_1 \\ \vdots \\ E_{N-1} + \overline{E}_{N-1} \end{bmatrix}.$$

The left-most matrix is an error location matrix. Note that the error location matrix only depends on the locations of the data blocks with errors. The right-most matrix is a redundancy block location matrix, which only depends on the static locations of the redundancy blocks. The block numbers of the redundancy blocks are 0 to N−1, where N is the number of redundancy blocks. The data blocks start with block number N and continue upward. Additionally, the right-most column vector is the set of residual blocks.

Both the error location matrix and the redundancy block location matrix are Vander monde matrices. One property of a Vander monde matrix is that it always has an inverse matrix, even if the matrix is not square. Another property of a Vander monde matrix is that inversion requires $O(N^2)$ operations, opposed to a general matrix, which requires $O(N^3)$ operations.

To solve for the error values ($Y_i$), the inverse of the error location matrix is obtained. The result is then multiplied by the redundancy block location matrix.

To obtain the inverse of the error location matrix, an error location polynomial ($\sigma(x)$) is computed. The error location polynomial is defined as:

$$\sigma(x) = \sum_{i=0}^{\rho} \sigma_i x^i = \prod_{i=0}^{\rho-1} (x - X_i)$$

where $\rho$ is the number of data blocks and redundancy blocks having errors, and $X_i$ is a particular error location. Note that the error location polynomial equals zero when x equals an error location.

Additionally, a function $\sigma^{(j)}(x)$ is determined each error location j as follows:

$$\sigma^{(j)}(x) = \frac{\sigma(x)}{(x - X_j)} = \sum_{i=0}^{\rho-1} \sigma_i^{(j)} x^i = \prod_{i \neq j} (x - X_i).$$

The function $\sigma^{(j)}(x)$ is zero when x equals an error location, except for error location j.

Each row of the inverse of the error location matrix contains the coefficients of the following polynomial:

$$\text{row } j = \frac{\sigma^{(j)}(x)}{\sigma^{(j)}(X_j)}.$$

In matrix form, the inverse of the error location matrix is as follows:

$$\begin{bmatrix} \frac{\sigma_0^{(0)}}{\sigma^{(0)}(X_0)} & \frac{\sigma_1^{(0)}}{\sigma^{(0)}(X_0)} & \cdots & \frac{\sigma_{N-1}^{(0)}}{\sigma^{(0)}(X_0)} \\ \frac{\sigma_0^{(1)}}{\sigma^{(1)}(X_1)} & \frac{\sigma_1^{(1)}}{\sigma^{(1)}(X_1)} & \cdots & \frac{\sigma_{N-1}^{(1)}}{\sigma^{(1)}(X_1)} \\ \vdots & \vdots & \ddots & \vdots \\ \frac{\sigma_0^{(\rho-1)}}{\sigma^{(\rho-1)}(X_{\rho-1})} & \frac{\sigma_1^{(\rho-1)}}{\sigma^{(\rho-1)}(X_{\rho-1})} & \cdots & \frac{\sigma_{N-1}^{(\rho-1)}}{\sigma^{(\rho-1)}(X_{\rho-1})} \end{bmatrix}.$$

Note that the columns of the error location matrix equal a constant raised to ascending powers. Thus, multiplying the error location matrix by its inverse is the same as evaluating $\sigma^{(j)}(x)$ with x equal to an error location ($X_i$). The result is the identity matrix.

To compute the error correction matrix, the error location matrix inverse is multiplied by the redundancy block location matrix. Since the redundancy block location matrix is a Vander monde matrix, each column equals a constant raised to ascending powers. Multiplying these two matrices together is the same as evaluating $\sigma^{(j)}(x)$ at the constant in each column of the redundancy block location matrix. Thus, the general form of the error correction matrix is as follows:

$$\begin{bmatrix} \frac{\sigma^{(0)}(\alpha^0)}{\sigma^{(0)}(X_0)} & \frac{\sigma^{(0)}(\alpha^1)}{\sigma^{(0)}(X_0)} & \cdots & \frac{\sigma^{(0)}(\alpha^{N-1})}{\sigma^{(0)}(X_0)} \\ \frac{\sigma^{(1)}(\alpha^0)}{\sigma^{(1)}(X_1)} & \frac{\sigma^{(1)}(\alpha^1)}{\sigma^{(1)}(X_1)} & \cdots & \frac{\sigma^{(1)}(\alpha^{N-1})}{\sigma^{(1)}(X_1)} \\ \vdots & \vdots & \ddots & \vdots \\ \frac{\sigma^{(\rho-1)}(\alpha^0)}{\sigma^{(\rho-1)}(X_{\rho-1})} & \frac{\sigma^{(\rho-1)}(\alpha^1)}{\sigma^{(\rho-1)}(X_{\rho-1})} & \cdots & \frac{\sigma^{(\rho-1)}(\alpha^{N-1})}{\sigma^{(\rho-1)}(X_{\rho-1})} \end{bmatrix}.$$

Note that the denominator is constant for a particular row. Therefore, the denominator only needs to be computed $\rho$ times instead of ($\rho \times N$) times. The error correction matrix relates the data to be corrected to the residual blocks.

In the present exemplary embodiment, the error correction matrix is simplified/reduced. More specifically, the error correction matrix can be made simpler if the number of missing data blocks is less than the maximum number of redundancy blocks (N). As described above, when the number of redundancy blocks exceeds the number of data blocks with errors, the excess redundancy blocks are removed. The error correction matrix size changes from ρ×N to size N×N, which may initial seem to have increased the size of the error correction matrix. However, the new error correction matrix now has trivial columns corresponding with each excess redundancy block (this is because the location of the removed redundancy block is part of the error location polynomial σ(x)). Furthermore, each row that corresponds with an excess redundancy block can be removed, assuming that the excess redundancy block is not reconstructed. With these changes, the size of the error correction matrix is now ν×ν, where ν is the number of data blocks having errors. Thus, the general solution for recreating the data blocks with errors is as follows:

$$\begin{bmatrix} Y_0 \\ Y_1 \\ \vdots \\ Y_{\nu-1} \end{bmatrix} = \begin{bmatrix} \frac{\sigma^{(0)}(Z_0)}{\sigma^{(0)}(X_0)} & \frac{\sigma^{(0)}(Z_1)}{\sigma^{(0)}(X_0)} & \cdots & \frac{\sigma^{(0)}(Z_{\rho-1})}{\sigma^{(0)}(X_0)} \\ \frac{\sigma^{(1)}(Z_0)}{\sigma^{(1)}(X_1)} & \frac{\sigma^{(1)}(Z_1)}{\sigma^{(1)}(X_1)} & \cdots & \frac{\sigma^{(1)}(Z_{\nu-1})}{\sigma^{(1)}(X_1)} \\ \vdots & \vdots & \ddots & \vdots \\ \frac{\sigma^{(\nu-1)}(Z_0)}{\sigma^{(\nu-1)}(X_{\nu-1})} & \frac{\sigma^{(\nu-1)}(Z_1)}{\sigma^{(\nu-1)}(X_{\nu-1})} & \cdots & \frac{\sigma^{(\nu-1)}(Z_{\nu-1})}{\sigma^{(\nu-1)}(X_{\nu-1})} \end{bmatrix}$$

$$\begin{bmatrix} E_{Z_0} + \overline{E}_{Z_0} \\ E_{Z_1} + \overline{E}_{Z_1} \\ \vdots \\ E_{Z_{\nu-1}} + \overline{E}_{Z_{\nu-1}} \end{bmatrix}$$

where $Z_i$ is the location of a redundancy block that was not erased. Additionally, the right-most column vector is the set of residual blocks. The simplified correction matrix relates the data blocks to be corrected to the residual blocks.

The general equation for each entry of the error correction matrix (U), which is a ν×ν matrix, at row i, and column j is as follows:

$$U_{ij} = \frac{\sigma^{(i)}(Z_j)}{\sigma^{(i)}(X_i)} = \frac{\prod_{k \neq i}(Z_j - X_k)}{\prod_{k \neq i}(X_i - X_k)}.$$

Note that if any entry in $Z_j$ equals $X_k$, then that entry in U is zero, which occurs when an excess redundancy block locations are included within $X_k$. Since these columns are trivial, they are not included.

Figure 5:
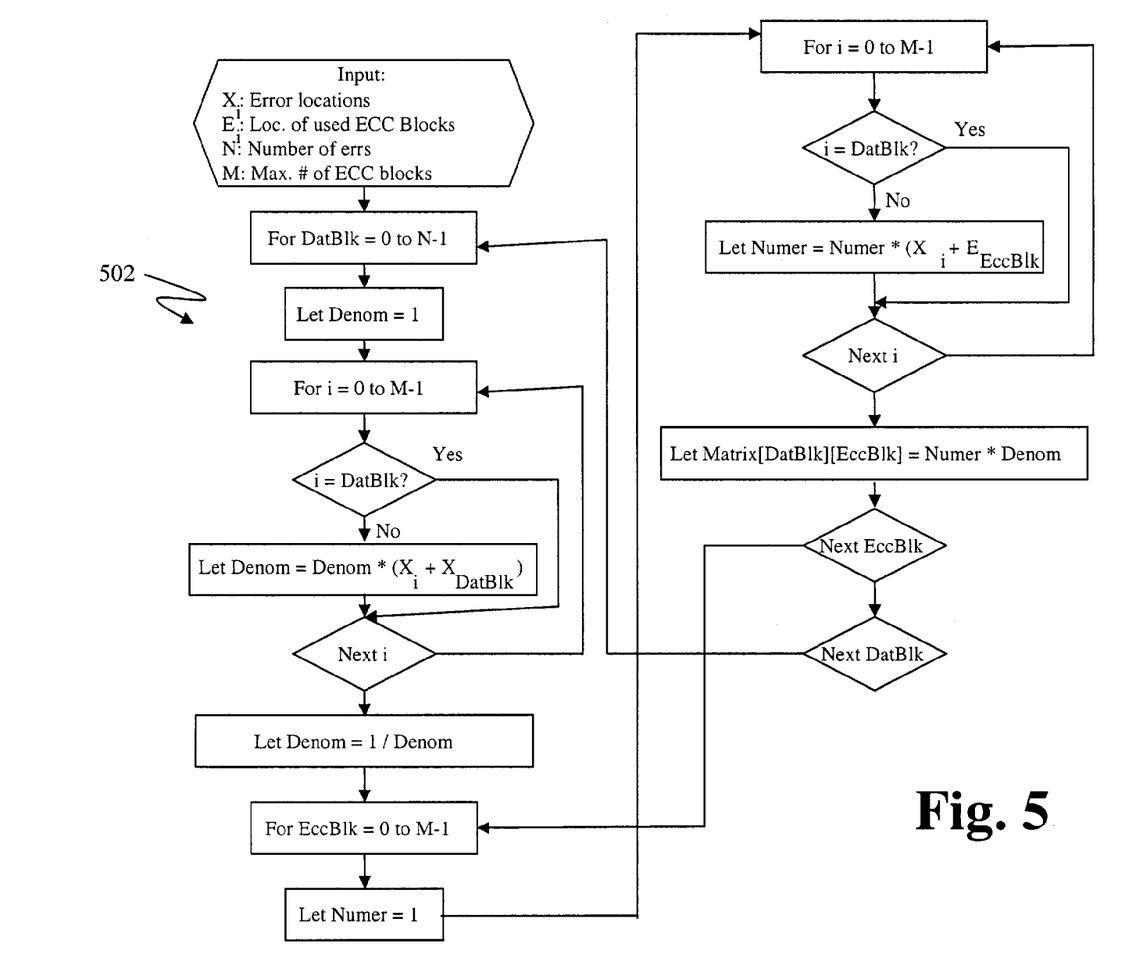
FIG. 5 depicts an exemplary process to generate entries of an error correction matrix.

Additionally, with reference to FIG. 5, an exemplary process 502 is depicted for generating each entry of the error correction matrix. Exemplary process 502 can be implemented as a computer program, which includes computer executable instructions to direct the operation of a storage device. For example, with reference to FIG. 1, exemplary process 502 (FIG. 5) can direct the operation of processor 110 of storage device 104. It should be recognized, however, that exemplary process 502 (FIG. 5) can be implemented in hardware, such as in an Application-Specific Integrated Circuit (ASIC).

Although exemplary embodiments have been described, various modifications can be made without departing from the spirit and/or scope of the present invention. Therefore, the present invention should not be construed as being limited to the specific forms shown in the drawings and described above.

I claim:

1. A method of correcting errors in data retrieved from a storage medium, comprising:
    retrieving a plurality of data blocks from the storage medium;
    retrieving a plurality of redundancy blocks associated with the plurality of data blocks from the storage medium;
    identifying one or more data blocks retrieved from the storage medium having errors;
    removing the one or more data blocks identified as having errors;
    when the number of data blocks identified as having errors is less than the number of retrieved redundancy blocks, removing one or more excess redundancy blocks and keeping one or more retained redundancy blocks from the retrieved redundancy blocks;
    generating one or more new redundancy blocks based on the retrieved data blocks;
    generating one or more residual blocks based on the one or more new redundancy blocks and the one or more retained redundancy blocks; and
    correcting the one or more data blocks identified as having errors using the generated one or more residual blocks.

2. The method of claim 1, wherein identifying one or more data blocks retrieved from the storage medium having errors comprises:
    retrieving a check sum associated with a retrieved data block from the storage medium;
    generating a new check sum based on the retrieved data block; and
    comparing the retrieved check sum with the new check to determine if the retrieved data block has errors.

3. The method of claim 2, wherein the check sum is a cyclic redundancy code.

4. The method of claim 1, wherein removing the one or more blocks identified as having errors comprises:
    flagging the one or more data blocks identified as having errors as erasures.

5. The method of claim 1, wherein the number of retained redundancy blocks is equal to the number of data blocks identified as having errors.

6. The method of claim 1, wherein the one or more new redundancy blocks are generated based on the retrieved data blocks with the one or more data blocks identified as having errors removed.

7. The method of claim 1, wherein the number of new redundancy blocks is equal to the number of data blocks identified as having errors.

8. The method of claim 1, wherein generating one or more residual blocks comprises:
    performing an exclusive-OR operation between a new redundancy block and a retrieved redundancy block.

9. The method of claim 1, wherein the residual blocks are syndromes.

10. The method of claim 1, wherein a residual block is a remainder after dividing a retrieved code word by a generator polynomial.

11. The method of claim 1, wherein correcting the one or more data blocks identified as having errors comprises:
    performing a Galois Field matrix multiplication operation between the one or more generated residual blocks and a correction matrix.

12. The method of claim 11, wherein the correction matrix relates one or more data blocks to be corrected to the one or more residual blocks.

13. The method of claim 11 further comprising:
remove one or more rows from the correction matrix corresponding to the one or more excess redundancy block to generate a reduced correction matrix, wherein the Galois Field matrix multiplication operation is performed between the one or more generated residual blocks and the reduced correction matrix rather than the correction matrix.

14. The method of claim 13, wherein the number of rows of the reduced correction matrix is equal to the number of data blocks identified as having errors 15. The method of claim 1, wherein the plurality of redundancy blocks are Bose-Chaudhuri-Hocquenghem (BCH) codes.

16. The method of claim 15, wherein BCH codes are Reed-Solomon codes.

17. A system of correcting errors in data retrieved from a storage medium, comprising:
a data buffer including:
a plurality of data blocks retrieved from the storage medium,
a plurality of redundancy blocks retrieved from the storage medium; and
a processor configured to:
identify one or more data blocks retrieved from the storage medium having errors,
remove the one or more data blocks identified as having errors,
when the number of data blocks identified as having errors is less than the number of retrieved redundancy blocks, remove one or more excess redundancy blocks and keep one or more retained redundancy blocks from the retrieved redundancy blocks,
generate one or more new redundancy blocks based on the retrieved data blocks,
generate one or more residual blocks based on the one or more new redundancy blocks and the one or more retained redundancy blocks, and
correct the one or more data blocks identified as having errors using the generated one or more residual blocks.

18. The system of claim 17, wherein the number of retained redundancy blocks is equal to the number of data blocks identified as having errors.

19. The system of claim 17, wherein the one or more new redundancy blocks are generated based on the retrieved data blocks with the one or more data blocks identified as having errors removed.

20. The system of claim 17, wherein the number of new redundancy blocks is equal to the number of data blocks identified as having errors.

21. The system of claim 17, wherein the one or more residual blocks are generated by:
performing an exclusive-OR operation between a new redundancy block and a retrieved redundancy block.

22. The system of claim 17, wherein the one or more data blocks identified as having errors is corrected by:
performing a Galois Field matrix multiplication operation between the one or more generated residual blocks and a correction matrix.

23. The system of claim 22, wherein the processor is further configured to:
remove one or more rows from the correction matrix corresponding to the one or more excess redundancy block to generate a reduced correction matrix, wherein the Galois Field matrix multiplication operation is performed between the one or more generated residual blocks and the reduced correction matrix rather than the correction matrix.

24. The system of claim 23, wherein the number of rows of the reduced correction matrix is equal to the number of data blocks identified as having errors 25. A computer-readable storage medium containing computer executable instructions for causing a computer to correct errors in data retrieved from a storage medium, comprising instructions for:
retrieving a plurality of data blocks from the storage medium;
retrieving a plurality of redundancy blocks associated with the plurality of data blocks from the storage medium;
identifying one or more data blocks retrieved from the storage medium having errors;
removing the one or more data blocks identified as having errors;
when the number of data blocks identified as having errors is less than the number of retrieved redundancy blocks, removing one or more excess redundancy blocks and keeping one or more retained redundancy blocks from the retrieved redundancy blocks;
generating one or more new redundancy blocks based on the retrieved data blocks;
generating one or more residual blocks based on the one or more new redundancy blocks and the one or more retained redundancy blocks; and
correcting the one or more data blocks identified as having errors using the generated one or more residual blocks.

26. The computer-readable storage medium of claim 25, wherein identifying one or more data blocks retrieved from the storage medium having errors comprises:
retrieving a check sum associated with a retrieved data block from the storage medium;
generating a new check sum based on the retrieved data block; and
comparing the retrieved check sum with the new check to determine if the retrieved data block has errors.

27. The computer-readable storage medium of claim 26, wherein the check sum is a cyclic redundancy code.

28. The computer-readable storage medium of claim 25, wherein removing the one or more blocks identified as having errors comprises:
flagging the one or more data blocks identified as having errors as erasures.

29. The computer-readable storage medium of claim 25, wherein the number of retained redundancy blocks is equal to the number of data blocks identified as having errors.

30. The computer-readable storage medium of claim 25, wherein the one or more new redundancy blocks are generated based on the retrieved data blocks with the one or more data blocks identified as having errors removed.

31. The computer-readable storage medium of claim 25, wherein the number of new redundancy blocks is equal to the number of data blocks identified as having errors.

32. The computer-readable storage medium of claim 25, wherein generating one or more residual blocks comprises:
performing an exclusive-OR operation between a new redundancy block and a retrieved redundancy block.

33. The computer-readable storage medium of claim 25, wherein the residual blocks are syndromes.

34. The computer-readable storage medium of claim 25, wherein a residual block is a remainder after dividing a retrieved code word by a generator polynomial.

35. The computer-readable storage medium of claim 25, wherein correcting the one or more data blocks identified as having errors comprises:
  performing a Galois Field matrix multiplication operation between the one or more generated residual blocks and a correction matrix.

36. The computer-readable storage medium of claim 35, wherein the correction matrix relates one or more data blocks to be corrected to the one or more residual blocks.

37. The computer-readable storage medium of claim 35 further comprising:
  remove one or more rows from the correction matrix corresponding to the one or more excess redundancy block to generate a reduced correction matrix, wherein the Galois Field matrix multiplication operation is performed between the one or more generated residual blocks and the reduced correction matrix rather than the correction matrix.

38. The computer-readable storage medium of claim 37, wherein the number of rows of the reduced correction matrix is equal to the number of data blocks identified as having errors 39. The computer-readable storage medium of claim 25, wherein the plurality of redundancy blocks are Bose-Chaudhuri-Hocquenghem (BCH) codes.

40. The computer-readable storage medium of claim 39, wherein BCH codes are Reed-Solomon codes.

* * * * *